United States Patent [19]
Narayannan et al.

[11] Patent Number: 5,345,538
[45] Date of Patent: Sep. 6, 1994

[54] VOICE ACTIVATED CONTROL APPARATUS

[76] Inventors: Krishna Narayannan, 423 N. St. Clair, Pittsburgh, Pa. 15206; Marc D. Liang, 6801 Linden La., Pittsburgh, Pa. 15206; John L. Kurtz, 983 Centennial Dr., Indiana, Pa. 15701

[21] Appl. No.: 826,339

[22] Filed: Jan. 27, 1992

[51] Int. Cl.⁵ .............................. G10L 9/00
[52] U.S. Cl. .................... 395/2.84; 395/2.79
[58] Field of Search ............. 128/630; 381/41–45; 395/2.84, 2.79; 364/413.02–413.04; 221/2, 3, 4, 5, 7–10, 12–13, 15; 367/198

[56] References Cited

U.S. PATENT DOCUMENTS

| | | | |
|---|---|---|---|
| 4,012,112 | 3/1977 | Masterson | 350/90 |
| 4,207,959 | 6/1980 | Youdin et al. | 180/167 |
| 4,482,032 | 11/1984 | Enriquez et al. | 340/19 R |
| 4,677,569 | 6/1987 | Nakano et al. | 381/43 |
| 4,704,696 | 11/1987 | Reimer et al. | 395/2 |
| 4,717,364 | 1/1988 | Furukawa | 446/175 |
| 4,725,956 | 2/1988 | Jenkins | 381/110 |
| 4,729,444 | 3/1988 | Tubman | 109/45 |
| 4,797,924 | 1/1989 | Schnars et al. | 381/43 |
| 4,799,171 | 1/1989 | Cummings | 381/51 |
| 4,811,243 | 3/1989 | Racine | 381/43 |
| 4,827,520 | 5/1989 | Zeinstra | 381/42 |
| 4,850,930 | 7/1989 | Sato et al. | 446/175 |
| 4,856,072 | 8/1989 | Schneider et al. | 381/86 |
| 4,862,363 | 8/1989 | Krisher et al. | 364/424.1 |
| 4,896,357 | 1/1990 | Hatano et al. | 381/43 |
| 4,913,676 | 4/1990 | Koguchi et al. | 446/300 |
| 4,923,428 | 5/1990 | Curran | 446/175 |
| 4,931,950 | 6/1990 | Isle et al. | 364/513 |
| 4,933,873 | 6/1990 | Kaufman et al. | 395/2 |
| 4,989,253 | 1/1991 | Liang et al. | 381/110 |
| 5,047,953 | 9/1991 | Smallwood et al. | 395/2 |

*Primary Examiner*—Michael R. Fleming
*Assistant Examiner*—Michelle Doerrler
*Attorney, Agent, or Firm*—Reed Smith Shaw & McClay

[57] ABSTRACT

A system is provided with a voice activated control apparatus which permits precise control of one or more system variables by means of voice commands uttered by the system operator. When a system variable is in a movement or change mode, the movement or change is terminated by any sound exceeding a preestablished acoustic threshold level. Any value of one or more system variables can be identified and appropriate data stored in a memory to permit the one or more system variables to return to an identified value or state with a single voice command. The control apparatus is combined with a screen monitor and/or an acoustic speaker to provide visible and/or acoustic responses to an operator. The control apparatus is practical for retrofitting existing remotely controllable systems.

17 Claims, 2 Drawing Sheets

VOICE ACTIVATED CONTROL APPARATUS

BACKGROUND OF THE INVENTION

1. Field of the Invention

This invention relates to a voice activated control apparatus operable to control one or more variables of a system in response to voice commands from the operator.

2. Description of the Prior Art

Speech recognition systems are capable of recognizing words spoken by human beings. Speech recognition systems are discussed in U.S. Pat. No. 4,757,541, No. 4,633,499 and No. 4,158,750. Isolated word recognition systems have been developed to recognize and discriminate isolated words (i.e., words separated by a pause) which have been trained into the systems. Such speech recognition devices have been summarized by D. Raj Reddy in an article entitled "Speech Recognition by Machine: A Review" published in the Proceedings of the IEEE, April 1976, page 501–531. Connected word recognition systems are capable of recognizing and discriminating individual words from spoken phrases.

It is known to use voice recognition control systems to operate computers through the use of voice commands. Such a system is disclosed in U.S. Pat. No. 4,776,016.

It is also known to use voice recognition systems to control system variables of various active systems. In U.S. Pat. No. 4,605,080, for example, a weighing scale is disclosed involving calculating functions that includes an automatic control system that can accept spoken words as input. A speech recognition system is used for processing and analyzing speech signals output by a microphone. The microphone is connected to a speech recognition computer which outputs and applies select command control signals to effect desired control functions. It is disclosed to control conveyors to place labels on containers automatically using the speech recognition system. The apparatus may be controlled to stop and start, slow down or speed up by an operator speaking the appropriate command words into a microphone.

In U.S. Pat. No. 4,641,292, an apparatus and method are disclosed for permitting human voice control of a welding system. It is disclosed that a human operator is provided with an audiotransmitter by which the operator adjusts the welding power supply through verbal commands. The verbal commands are issued by the operator and are transmitted through a receiver to a voice recognition unit. The received signal is interpreted by a computer which is electrically connected to deliver power control signals to the welding power supply and thereby adjust the power delivered to the welding torch. The operator may also issue verbal commands to start and stop an internal combustion engine which drives the welding power supply, when the engine is used.

U.S. Pat. No. 4,472,617 discloses a heating apparatus such as an electrical oven or microwave oven which includes an enclosure case having a heating chamber in which an object to be heated is placed. It is disclosed to incorporate a voice recognition circuit for recognizing voice commands of a user of the apparatus to produce a control signal which controls a releasing means to open the door of the heating apparatus.

Various voice actuation and control systems are also disclosed in U.S. Pat. Nos. 4,799,171, 4,797,924, 4,725,956, 4,717,364 and 4,482,032.

Presently known voice recognition control systems suffer from several drawbacks, however. In all systems presently available, a particular system variable, once set into movement or change can only be stopped by using a recognizable command such as the word "stop" or the word "halt". The required interpretation/recognition step introduces a delay in actually stopping the activity. This delay can be crucial when very accurate control is required. Also, an operator, when excited in an emergency situation, will often forget the particular word (e.g., "stop") required to cease an ongoing change of a system variable. By the time control of the variable is achieved, severe system damage or physical injury can occur. It is therefore desirable to develop a system which does not suffer from these deficiencies.

Moreover, systems to be controlled often have various states or positions (i.e., a certain value for one or more system variables) which are utilized often during operation of the system. It is thus desirable to enable the operator to simply define such states or positions using a simple verbal code and thereby later enable the operator to return such a specified state or position by simply uttering the verbal code.

STATEMENT OF THE PRESENT INVENTION

Generally, the present invention provides a voice activated control apparatus for controlling at least one variable of a system comprising a drive means responsive to electrical signals for creating controlled change of the at least one variable, a sound detection means for converting acoustic energy into audio-electrical signals and a control means. The control means includes a word recognition means for identifying preestablished commands from the audio-electrical signals and for generating corresponding identified electrical signals. A means is also provided for generating operating electrical signals corresponding to the identified electrical signals. The generating means is preferably a computer. An output signal generator means, responsive to the operating electrical signals is provided to deliver actuating electrical signals to the drive means, whereby word commands corresponding to the preestablished word commands, applied to the sound detection means will result in preestablished controlled change of the at least one variable.

The word recognition means is preferably an isolated-word recognition device which recognizes a limited number of speech commands and provides a unique electrical signal or a unique computer word in response to each recognized speech command.

In one embodiment, the voice activated control apparatus provides programmable control to return the system to previously defined state(s) (i.e., to previously defined value(s) of the at least one variable) which are recorded in a memory. Preferably a computer memory is provided. The activated control apparatus thus preferably includes a means for measuring the value of the at least on variable, a means for storing this value, and a means for restoring the variable to stored value.

A voice activated control apparatus for controlling the position of a movable robotic arm, for example, preferably includes a computer counter means for measuring the direction and distance of each movement of the system from a predetermined position. Such an apparatus also preferably includes a computer memory means to record the instantaneous summation of the counter means at an identified instant in response to a preestablished word command applied to the sound detection means. Finally, the apparatus includes a means, for restoring the system to the position of the system at the instant.

In another embodiment, the voice activated control apparatus includes a stop means for stopping any movement (i.e., change in a variable) of the system when any audio-electrical signal is delivered to the control means having an amplitude which exceeds a preestablished threshold amplitude while the system is in motion.

The control apparatus further preferably includes means for moving the system variables through established search patterns. The control apparatus also preferably provides sequential mode recognition to permit change and rate of change control for selected controlled changes of variables.

The present voice activated control apparatus is, therefore, well suited for application to systems requiring relatively accurate control of one or more system variables. The present voice activated control apparatus is also well suited for application to systems for which it is desired or required to return to one or more operator defined states (values of system variable(s)) during operation.

The present voice activated control apparatus can be used to control a wide range of systems and system variables. In a chemical reactor, for example, the operator may wish to change a system variable such as the pressure, temperature or reactant inflow. Use of voice activated control can free an operator of such a system from the necessity of looking away from monitor displays while changing system variables. The programmable control and stop features of the present invention would be desirable for providing substantially fail safe control to such an operator.

The present voice activated control apparatus is practical for retrofitting existing remotely controllable system.

The objects and advantages of the present invention will become apparent in the following detailed description by reference to the accompanying drawings.

DESCRIPTION OF THE PREFERRED EMBODIMENTS

Spatial position is a system variable over which control is often desired. Accurate and reproducible control is often desired, for example, over the position of robotic arms. In the medical arts, accurate positioning of various instruments or systems is not only desirable but necessary to ensure success of a procedure and patient safety. It is also desirable to return the position of many such systems to previously defined positions. An excellent example of such a system is an adjustable surgical microscope. Further examples are automated wheelchair devices and hospital beds. The benefits of the present voice activated control apparatus are well illustrated by its application to optical microscopes used by physicians during surgery.

Figure 1:
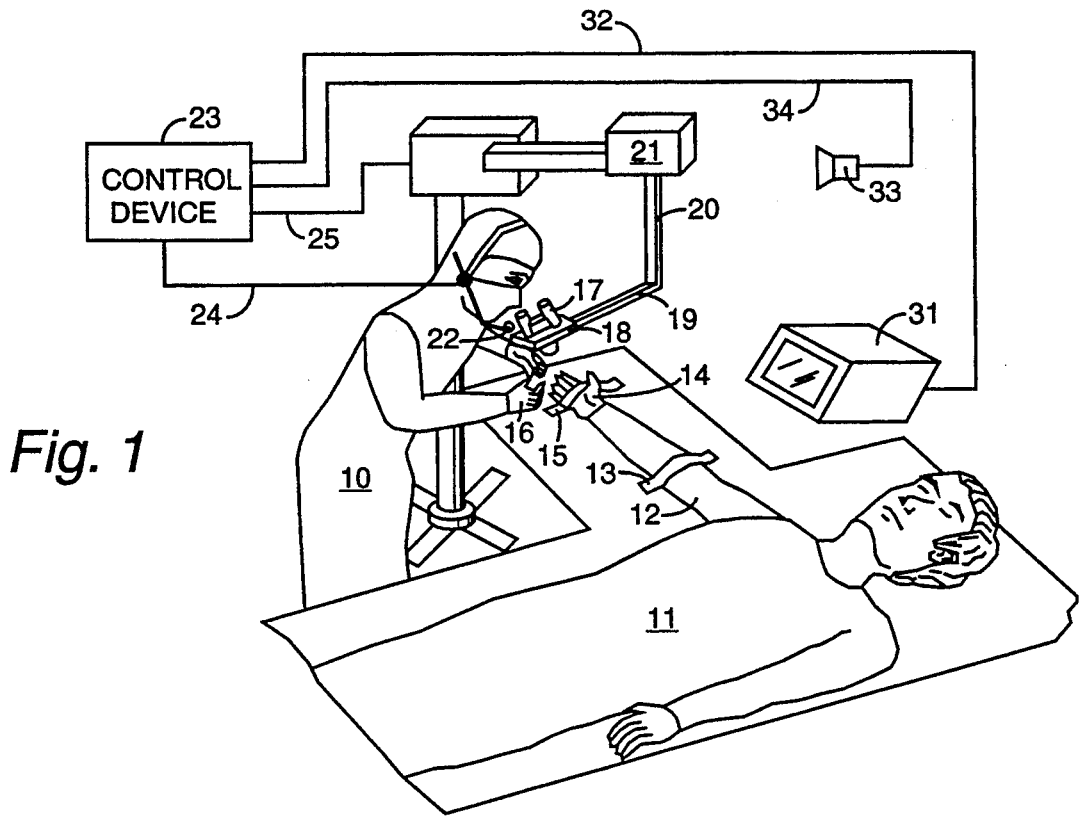
FIG. 1 is a perspective schematic illustration of a microsurgeon conducting a surgical procedure on an anesthetized hand of a patient, using a voice activated surgical operating microscope according to the present invention.

A typical microsurgical procedure is illustrated in FIG. 1 wherein a microsurgeon 10 is performing microsurgery for a patient 11 whose right arm 12 is secured by a restraint 13 and whose anesthetized hand 14 is secured by a restraint 15. The microsurgeon 10 is shown to be using both of his hands 16 to carry out the procedure.

A microscope 17 is secured in a microscope supporting structure 18 which is cantilevered through structural support members 19 and 20 to a rigid mounting box 21, which in a preferred embodiment contains servo devices to position structural support members 19 and 20. Control motors such as analog electric motors or digital stepping motors may be used.

An audio microphone 22 is provided for the microsurgeon 10 to communicate instructions to the control system of the present invention whereby:

(a) the microscope supporting structure 18 may be moved in selected directions by means of appropriate adjustment of the structural support members 19 and 20;

(b) the focal length of the microscope 17 may be adjusted; and, in some embodiments, (c) the inclination of the microscope 17 with respect to the microscope supporting structure 18 may be adjusted.

The system variables to be controlled in the case of microscope 17 are thus the microscope position, including orientation, and the lens position (i.e., the focal length).

As a consequence of the present invention, the microsurgeon 10 can continuously view the patient's hand 14 through the microscope 17 while having both hands 16 available for efficient, uninterrupted completion of the surgical procedure. A typical procedure of the type illustrated in FIG. 1 is an anastomosis of a vein or an artery in the patient's hand 14.

Figure 2:
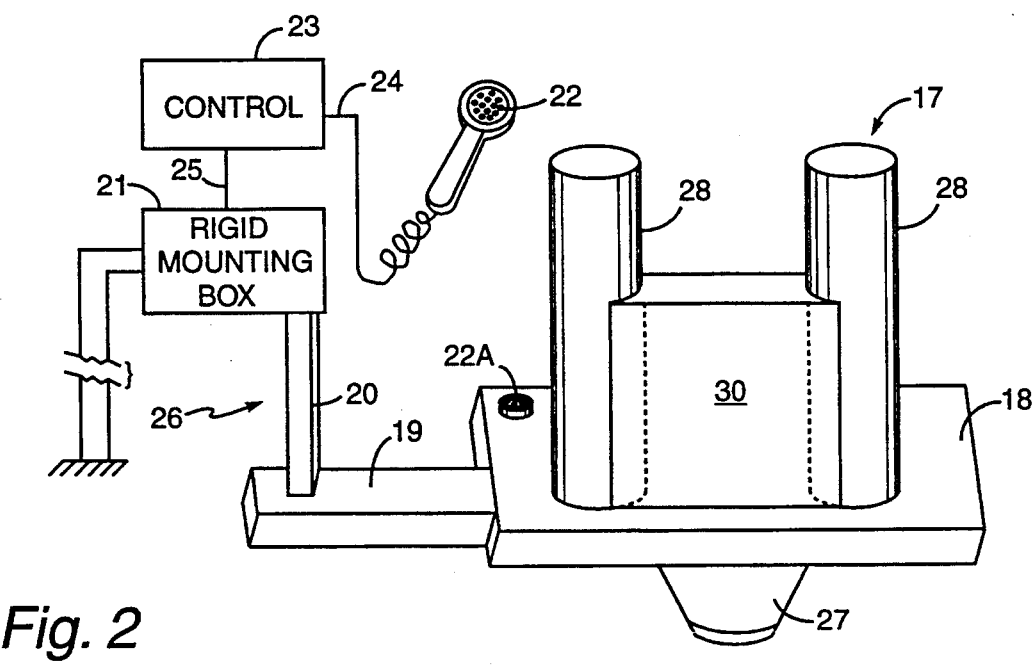
FIG. 2 is a schematic representation of the surgical operating microscope according to this invention.

Elements related to this invention are illustrated in FIG. 2 which includes the microscope supporting structure 18, the microscope 17, the structural supporting members 19 and 20, the rigid mounting box 21 and the operator's audio microphone 22 which is connected to a control device 23 by means of a conductor cable 24. Alternatively the acoustic microphone 22 may have radio transmission capability and the control device 23 may have a radio receiving capability so that the conductor cable 24 can be eliminated and radio communication can be substituted. As a further alternative, the microphone 22A may be secured to the microscope 17 or to the microscope supporting structure 18.

The control device 23 is shown to be connected to the rigid mounting box 21 by means of a conductor 25. Similarly the control device 23 may generate radio signals which are transmitted to a radio receiver within the rigid mounting box 21.

The control device 23 comprises a computer as the principal component having as its peripheral devices a word recognition device, interface hardware for a microscope movement activator, and a speaker 33 (FIG. 1) and an information display monitor 31 (FIG. 1). For simplicity, the word recognition device is preferably an isolated-word recognition device.

Figure 3:
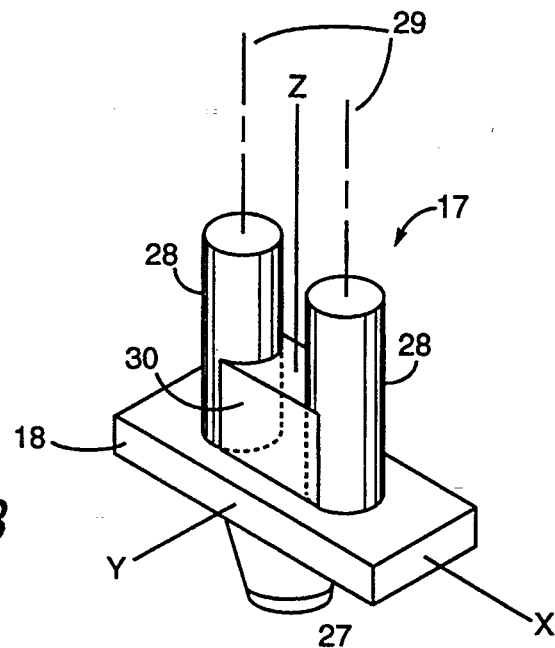
FIG. 3 is a perspective sketch of a typical microscope illustrating movements.

Mounting system 26 (rigid mounting box 21 and structural support members 19 and 20) contains motor-operated first means (the construction of which forms no part of the present invention), which extend, rotate and retract the structural support members 19 and 20 to position the microscope supporting structure 18 as desired. Movements of the microscope supporting structure 18 may occur as indicated graphically in FIG. 3 in the X direction, the Y direction or the Z direction corresponding to left-right, forward-back and up-down. Excellent results can be achieved with controlled movement only in the X-direction and the Y-direction. The operator can manually position the microscope at an appropriate elevation so that no Z-direction movement is needed.

The microscope 17 has an objective lens 27 and binocular lenses 28. The microscope 17 has two parallel longitudinal axes 29 which can be maintained at a fixed inclination with respect to the microscope supporting structure 18. The microscope may be pivotally joined to the microscope supporting structure 18 to permit adjustment of the angle of inclination between the longitudinal axes 29 and the microscope supporting structure 18. In a preferred embodiment, the microscope 17 may be securely mounted with respect to the microscope supporting structure 18 and the inclination of the microscope supporting structure 18 may be adjusted by appropriate mechanical movements of the structural members 19 and 20, i.e., by rotation about the X-axis of FIG. 3.

The focal length adjusting device 30 is a motor-operated second means, interposed between the microscope supporting structure 18 and the microscope 17 to permit lengthwise adjustment of the binocular lenses 28 with consequent adjustment of the focal length of the microscope 17. A worm gear and toothed rail device may be employed to achieve lengthwise extension and contraction of the binocular lenses 28.

All of the movements of the microscope, thus far described, can be accomplished by a remote operating control device having buttons or pedals to control the speed and nature of each of the microscope movements.

In operation, the acoustical sounds (command words) introduced at the audio microphone 22 are delivered as audio-electrical signals through the conductor 24 to the control device 23 which delivers a corresponding actuating electrical signal through the conductor 25 to the rigid mounting box 21. The actuating electrical signals operate the various motors in the microscope supporting structure 18, in the structural support members 19 and 20 and in the rigid mounting box 21. When the microscope 17 or supporting structure 18 is in a movement mode, the audio-electric signal bypasses the isolated-word recognition software and delivers a digital signal directly to the motor control software so that any acoustic input will halt the existing movement mode instantaneously.

Initially the microscope supporting structure 18 is positioned in the general region of operation, the structural support members 19 and 20 are approximately midway within the range of movements for the microscope mount 18 in the X-Y directions and the Z-direction, if controllable. Thereafter the operator causes the desired movement of the microscope mount 18 by appropriate voice commands, for example, "LEFT", which is detected in the control device 23.

Preferably, the present invention is provided with a means for controlling the rate at which a system variable is changed. In the case of microscope 17, for example, after a word command of "LEFT", the movement will proceed to the left along the X-axis at a preestablished velocity unless the operator precedes the direction command with an audible instruction, "ZOOM", which is identified in the control device 23. A corresponding actuating electrical signal is delivered through the conductor 25 to the rigid mounting box 21 to move at an increased speed. The movement will continue until the microscope mount 18 has reached the end of the available focus of movement or until the control device 23 receives a STOP command which is delivered orally through the audio microphone 22 and the conductor 24.

The operator can thereafter provide another signal sequence, e.g., DOWN, UP, ZOOM-RIGHT, ZOOM-UP, etc., which will cause a movement of the microscope mount 18 until an appropriate STOP signal is received and carried out. Thereafter the operator can observe through the binocular lenses 28 and provide a vocal command to "FOCUS DOWN" which will be recognized by the word recognition device and which will result in an appropriate electrical signal from the control device 23 to the rigid mounting box 21 through conductor 25. The conductor 25 continues (not seen in FIG. 2) through the structural support members 20 and 19 and delivers an electrical signal to the focal length adjusting device 30 causing the tubes of the microscope 17 to change length with a corresponding change in the focal length of the microscope 17 until the operator delivers an audible STOP command when the object of microscopic observation is in proper focus.

It is desirable for the surgeon 10 to be aware of the vocal commands which have been received by the control device 23. Accordingly it is desirable as shown in FIG. 1 to have a feedback means such as visible screen monitor 31 connected through a cable 32 to the control device 23. In a preferred embodiment, the television screen monitor 31 will display the operator's commands which have been received and executed. Thus if the operator 10 commands "ZOOM LEFT" the phrase "ZOOM LEFT" will appear on the visible screen monitor 31. The visible screen monitor 31 may provide a audible indication, such as a beep, if the control device 23 was unable to discriminate the operator's command. If desired, the monitor screen image can be projected with a beam-splitter directly to an appropriately-equipped microscope 17 where the image will appear in the viewing field of the microscope 17.

A further desirable feature is a feedback means such as an audio-speaker 33 connected to the control device 23 through cables 34, 32. The audio-speaker 33 may be connected to a voice synthesizer within the control device 23 which will provide a audible response to indicate which message the control device 23 has received and executed. Thus if the operator 10 issues a vocal command "UP", the control device 23 will recognize the instruction and will repeat the word "UP" at the audio-speaker 33. If the control device 23 did not recognize the word "UP", the audio-speaker 33 will remain silent or will articulate the command word which was received by the control device 23. Alternatively, a acoustic "beeping" means may generate audible sounds when a spoken word is not recognized by the word identification software to a desired degree of confidence.

OPERATION

The present invention has a training regiment for each operator in order to provide recognition of the unique speech patterns of each operator. Each word command in the machine vocabulary is trained into the control system's memory by each operator at least twice. In a preferred embodiment, the individual word commands in the control system vocabulary appear on the visible screen monitor 31, or are uttered by the voice synthesizer through the speaker 33. This constitutes a request by interactive software associated with the computer means for utterance of each preestablished word command. The operator 10 speaks each word command into the microphone 22. The voice pattern of the operator 10 is retained in memory within the control device 23. After, the operator 10 has trained his unique vocal commands into the control system, it may not be necessary to repeat the training for each reuse of the control system by the operator; instead, the prior memory may be called up for the operator 10. If, during the training regimen, the operator 10 utters a particular word command differently, the word recognition program will require further repetition of the word command until at least two closely matching voice patterns are received for each word command in the vocabulary.

A commercially available isolated-word recognition program can be purchased under the trademark VOICEMASTER (COVOX, Inc.) available for use with a Commodore 64(TM) computer. The purpose of the training regiment is to assure that the isolated-word recognition program will identify the words of the operator 10 and carry out the intended functions.

The isolated-word recognition devices are "templates"—which correspond to each programmed utterance. In the present invention, the software preferably is designed to require at least two, preferably three, such templates for each utterance. The audio electrical signal is evaluated by its comparison to each of the command word templates in the memory. The templates with the highest "score" indicate the command word which will be identified by the word-recognition device.

The proposed vocabulary for any control system is preferably limited for ease of use. A preferred vocabulary for use with microscope 17 comprises the following eight words:

| UP | DOWN |
|---|---|
| LEFT | RIGHT |
| FORWARD | BACK |
| ZOOM | FOCUS |

These eight words may be employed by the operator in 14 different combinations:

| UP | ZOOM UP |
|---|---|
| DOWN | ZOOM DOWN |
| LEFT | ZOOM LEFT |
| RIGHT | ZOOM RIGHT |
| FORWARD | ZOOM FORWARD |
| BACK | ZOOM BACK |
| FOCUS UP | |
| FOCUS DOWN | |

Additional commands can be employed where the microscope has location memory features:

| POINT | RETURN |
|---|---|
| ONE, TWO, THREE, FOUR, FIVE ... etc. | |

During the operation of the device, the operator initiates movement of the microscope mount by any of the following expressions: UP, DOWN, LEFT, RIGHT, FORWARD, BACK, ZOOM UP, ZOOM DOWN, ZOOM LEFT, ZOOM RIGHT, ZOOM FORWARD, ZOOM BACK. The direction of the movement is with respect to the operator 10 (FIG. 1). Each of these instructions will cause the microscope mount 18 to move in the indicated direction at a normal speed or at an increased (ZOOM) speed.

When the microscope supporting structure 18 has moved to the desired position, the operator commands "stop" or any other word or any other sound of sufficient amplitude (i.e., a STOP command). The control device 23 is programmed to cause immediate stoppage of the existing movement mode in response to the next sound received by the control device 23.

When the microscope supporting structure 18 is in the desired location, the operator can adjust the focus of the microscope 17 with the commands FOCUS UP or FOCUS DOWN followed by the STOP command when the desired field of observation becomes clear.

Within the control device 23, a timer means (e.g., a clock) maintains a record of the movements in each of the available directions (UP, DOWN, LEFT, RIGHT, FORWARD, BACK) from the initial location. When the operator determines an appropriate position, the operator can instruct the control device with a keyword or phrase such as POINT followed by a number, for example, POINT-ONE. A means is provided for measuring the value of the system variables at the instant the operator provides the proper instruction. In the case of microscope 17, for example, the control device 23 will record the distances from the initial location in each movement direction. Thereafter, when the phrase RETURN-ONE is spoken, the control means will restore the microscope to the location previously identified by the operator as POINT 1. A number of additional memory locations can be available. Five such locations seems to be a realistic maximum when using numerical designations. By using designations having a specific meaning to the operator of a system, it is possible to expand the number of memory locations. In a system such as a hospital bed, for example, one may use the designation POINT-SIT.

Similarly, in the case of microscope 17, the distances moved by the FOCUS UP, FOCUS DOWN operating device from a predetermined position (e.g., the initial position) can be recorded in the memory device corresponding to the POINT (NUMBER) indication so that the user may return to prior locations and the microscope will be properly positioned and focused for each procedure.

If the available microscope has controllable movements only in the X and Y directions at a single movement speed and has no controllable focus apparatus, the vocabulary can be reduced to:
LEFT
RIGHT
which will provide voice control of the available movements. The timing regimen can be shortened correspondingly.

Figure 4:
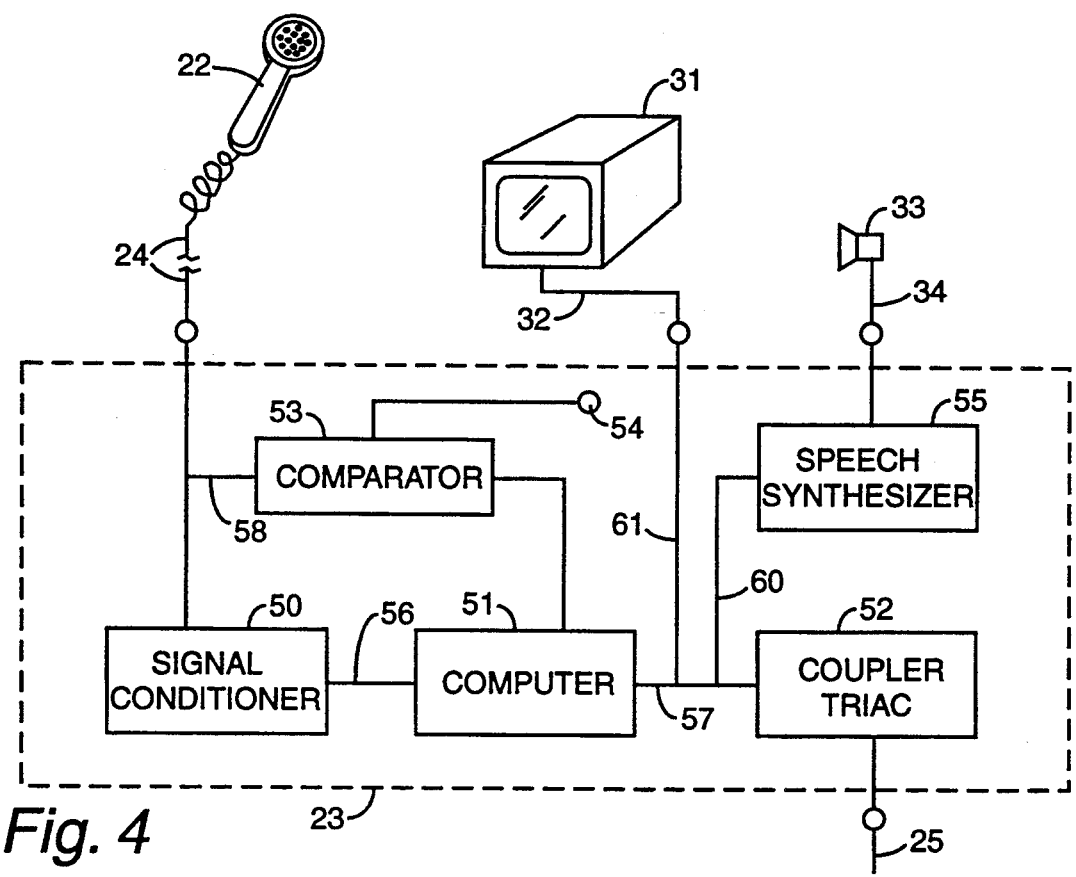
FIG. 4 is a schematic illustration of appropriate control circuitry employed in the several embodiments of this invention.

Referring to FIG. 4, the control device 23 is indicated as a broken-line box. The control device 23 receives an audio electric signal from a conductor 24 and delivers actuating electrical signals through a conductor 25 to control the movement of the servo devices which cause movements of the microscope mount and the microscope focal lengths. The conductors 32, 34 deliver operating electrical signals to a visible screen monitor 31 and a acoustic speaker 33.

Within the control device 23, in the preferred embodiment, there is a signal conditioner 50, a computer 51, a coupler triac 52, a comparator 53, source of fixed d.c. voltage 54 and a speech synthesizer 55. The coupler triac is a preferred output signal generator which generates actuating electrical signals. In the preferred embodiment, the control device 23 is software-controlled by the computer 51.

The signal conditioner 50 receives the audio-electrical signal from the conductor 24 and identifies the words to create an identified electrical signal delivered through a conductor 56 to the computer 51. A typical signal conditioner 50 is commercially available under the trade name COVOX VOICE MASTER.

NOTE; The COVOX VOICE MASTER Provides both hardware and software but is compatible with the software in the computer 51.

The computer 51 develops an appropriate operating electrical signal and delivers that operating electrical signal through a conductor 57 to the coupler triac 52 which generates and delivers corresponding actuating electrical signals to the servo devices in the rigid mounting box 21 to effect the intended movement of the microscope supporting structure 18 and microscope 17. It is understood that the actuating electrical signals can be used to control a number of other devices such as flow regulators, temperature regulators and pressure regulators in systems other than microscope 17.

In the case of microscope 17, the computer 51 includes counter-means for recording the duration and speed of each movement mode to develop a memory for each SET POINT position of the supporting structure 18 and microscope 17. The computer 51 also includes interactive software to direct the training regimen for each user.

The comparator 53 is a preferred means for the STOP function of this invention. The incoming audio-electric signal from the conductor 24 is delivered to the comparator 53 by conductor 58. The voltage of the audio-electric signal from the conductor 58 is compared with a threshold voltage from the d.c. voltage source 54. The output signal from the comparator 53 is delivered to a conductor 59 directly to the computer 51 as a digital signal—that is, a first signal or a second signal, digitally represented as a "one" or a "zero". When the "one" signal is received by the computer 51, the existing movement mode is instantly terminated; when the "zero" signal is received, the movement may continue uninterrupted. If there is no existing movement, the computer is unaffected. The comparator 53 by-passes the signal conditioner 50 and thereby develops an instantaneous response to any sound above a preestablished threshold which can be set at the d.c. voltage source 54. The instantaneous response to any sound exceeding the preestablished threshold provides a fail-safe feature for control of a system.

Alternatively a digital signal circuit (not shown) may provide the STOP function of the system. The described analog circuit will function substantially instantaneously whereas the digital signal circuit can halt movement in about one millisecond.

An operating electrical signal for the conductor 57 is delivered through a conductor 60 to the speech synthesizer 55 which generates an audio speech signal corresponding to that which has been identified by the signal conditioner 50. For example, if the operator commands ZOOM-UP, then the speech synthesizer 55 will create the audio speech signal ZOOM-UP which the user can hear from the audio speaker 33 to verify that the correct motion has been activated. The wrong message or no message from the audio speaker 33 indicates that the system misunderstood the command or did not receive the command or is otherwise malfunctioning. Alternatively the operating electrical signal from the conductor 57 can be directed to the display monitor 31 through a conductor 61 so that the active command will be visibly displayed for the user's guidance, e.g., the words ZOOM-UP will appear on the visible screen monitor.

Developing Speech Vocabulary

In a preferred embodiment of the invention, the computer 51 includes interactive software to enable each individual operator to develop unique voice recognition patterns for the control system. The individual operator will be requested either audibly through the audio speaker 33 or visibly from the visible screen monitor 31 or both to speak into the audio microphone 22 each of the word commands in the control system vocabulary. Each of the word commands will he repeated and will require an audible response from the operator until vocabulary memory means within the computer 51 has at least two speech patterns which are identifiable with the word command. At this training stage, substitute word commands may be employed which are the equivalent of the normal and customary word commands. For example, the word UP may be expressed by a foreign language operator as another expression which is the foreign language equivalent of UP. The computer 51 thereafter will recognize that term as the equivalent of the UP voice command for that foreign language operator. Thus the computer 51 has a memory which can identify the vocabulary word commands or their equivalents for each of the intended movement modes. The vocabulary training regimen continues until each of the vocabulary word commands has been expressed and accepted at least twice by the computer memory.

In extended surgical procedures, where operators alternate their surgical functions, the same surgical microscope may he employed alternately by different operators. If each operator has trained his unique vocabulary into the vocabulary memory, the computer 51 can employ the preestablished vocabulary memory of each active operator.

Established Search Patterns

The control device 23 may be programmed to change system variables through preestablished search patterns. In the case of microscope 17, control device 23 may be programmed to move microscope supporting structure 18 through preestablished search patterns such as left-to-right; up-to-down; and forward-to-back. Another search program advances the microscope mount from the maximum UP-LEFT-FORWARD position to the maximum DOWNRIGHT-BACK position to provide the operator with an appreciation of the range of available movement. A further preestablished program is to position the microscope supporting structure 18 at the mid-range of the LEFT-RIGHT movement, the UP-DOWN movement and the FORWARD-BACK movement for initiating a particular surgical procedure.

Although the invention has been described in detail for purposes of illustration, it is to be understood that such detail is solely for that purpose and that variations can be made therein by those skilled in the art without departing from the spirit and scope of the invention except as it may be limited by the claims.

What is claimed is:

1. A voice activated control apparatus for control of at least one variable of a system, comprising:
    drive means responsive to electrical signals for creating controlled changes of the at least one variable;
    sound detection means for converting acoustic energy into audio-electrical signals;
    control means including:
        word recognition means for recognizing commands from said audio-electrical signals and for generating corresponding identified electrical signals;
        means for generating operating electrical signals corresponding to said identified electrical signals;
        output signal generator means, responsive to said operating electrical signals for delivering actuating electrical signals to said drive means;
        means for measuring the value of the at least one variable;
        memory means for recording the value of the at least one variable at an identified instant in response to a command applied to said sound detection means indicating that the value at the identified instant should be recorded, said memory means also recording a value identifying command applied to said sound detection means and corresponding to the value of the at least one variable at the said identified instant; and
        means for restoring the at least one variable to the value of the at least one variable at said identified instant upon application of said value identifying command to said sound detection means.

2. The voice activated control apparatus of claim 1 wherein the at least one system variable is position.

3. The voice activated control apparatus of claim 2, wherein said measuring means comprises a counter means for measuring the direction and distance of each movement of the system from a predetermined position.

4. The voice activated control apparatus of claim 3, further comprising a means for effecting predetermined search patterns.

5. The voice activated control apparatus of claim 1, wherein said control means comprises a computer.

6. The voice activated control apparatus of claim 1, wherein said word recognition means is an isolated-word recognition means.

7. The voice activated control apparatus of claim 1, further comprising means for controlling the rate of change of the at least one variable.

8. The voice activated control apparatus of claim 1 further comprising a stop means for stopping any change of the at least one variable when any audio-electrical signal is delivered to said control means having an amplitude which exceeds a preestablished threshold amplitude while said variable is in a state of change.

9. The voice activated control apparatus of claim 8 wherein said stop means includes a voltage comparator which compares the voltage of said audio-electrical signal to a preestablished voltage and delivers a first signal when said audio-electrical signal is less than said threshold voltage and delivers a second signal when said audio-electrical signal is equal to or greater than said threshold voltage.

10. The voice activated control apparatus of claim 8 wherein said variable remains unchanged after change is stopped until another audio-electrical signal corresponding to one of said word commands is applied to said sound detection means.

11. A voice activated control apparatus for control of at least one variable of a system, comprising:
    drive means responsive to electrical signals for creating controlled changes of the at least one variable;
    sound detection means for converting acoustic energy into audio-electrical signals;
    control means including:
        word recognition means for identifying commands from said audio-electrical signals and for generating corresponding identified electrical signals;
        means for generating operating electrical signals corresponding to said identified electrical signals;
        output signal generator means, responsive to said operating electrical signals for delivering actuating electrical signals to said drive means, whereby word commands corresponding to said commands, applied to said sound detection means will result in preestablished controlled changes of the at least one variable; and
        stop means for stopping any change of the at least one variable when any audio-electrical signal is delivered to said control means having an amplitude which exceeds a preestablished threshold amplitude while said variable is in a state of change, said variable remaining unchanged until another audio-electrical signal corresponding to one of said word commands is applied to said sound detection means.

12. The voice activated control apparatus of claim 11 wherein said stop means includes a voltage comparator which compares the voltage of said audio-electrical signal to a preestablished voltage and delivers a first signal when said audio-electrical signal is less than said threshold voltage and delivers a second signal when said audio-electrical signal is equal to or greater than said threshold voltage.

13. The voice activated control apparatus of claim 11 wherein the at least one variable is position.

14. The voice activated control apparatus of claim 11 wherein said word recognition means is an isolated-word recognition means.

15. The voice activated control apparatus of claim 11, further comprising means for controlling the rate of change of at least one variable.

16. The voice activated control apparatus of claim 11, further comprising a means for effecting predetermined search patterns.

17. The voice activated control apparatus of claim 11, wherein said control means comprises a computer.

* * * * *